| FIG. 1A | FIG. 1B |
|---|---|

INVENTORS
STANLEY H. BOUR
BARRIE BRIGHTMAN
BY George J. Seligsohn
ATTORNEY

Sept. 5, 1967 S. H. BOUR ETAL 3,340,363

SIGNAL AMPLITUDE SEQUENCED TIME DIVISION MULTIPLEX COMMUNICATION SYSTEM

Filed Jan. 26, 1965

3 Sheets-Sheet 2

Sept. 5, 1967 S. H. BOUR ETAL 3,340,363

SIGNAL AMPLITUDE SEQUENCED TIME DIVISION MULTIPLEX COMMUNICATION SYSTEM

Filed Jan. 26, 1965

3 Sheets-Sheet 3

3,340,363

SIGNAL AMPLITUDE SEQUENCED TIME DIVISION MULTIPLEX COMMUNICATION SYSTEM

Stanley H. Bour, East Rochester, and Barrie Brightman, Webster, N.Y., assignors to Stromberg-Carlson Corporation, Rochester, N.Y., a corporation of Delaware
Filed Jan. 26, 1965, Ser. No. 428,030
7 Claims. (Cl. 179—15)

Figures 1A, 1C:
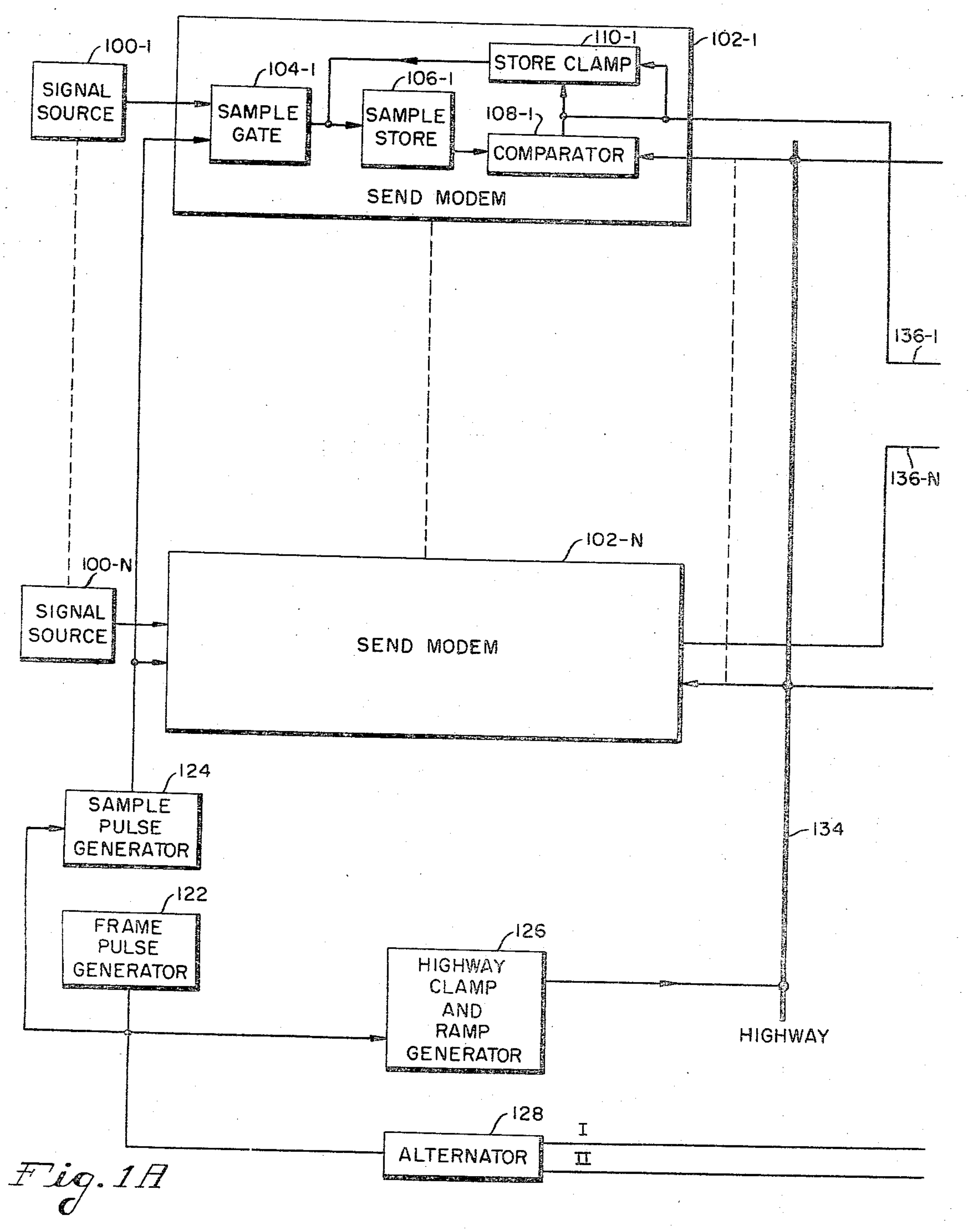

This invention relates to a time division multiplex communication system and, more particularly, to such a system which is signal amplitude sequenced, i.e., where the time of transmission of a signal sample during each repetitive time frame is determined by the instantaneous amplitude of the signal being sampled.

In a conventional time division multiplex communication system, a repetitive time frame is divided into a predetermined number of non-overlapping time slots. A different time slot is allotted to each one of a plurality of simultaneous independent communications carried over a common transmission highway. An individual, normally closed, send gate associated with each communication has its output coupled to a common transmission highway, and an individual, normally closed, receive gate associated with each communication has its input coupled to the common transmission highway. The pair of send and receive gates associated with each particular communication is opened only during the time slot allotted to that communication, whereby amplitude-modulated sample pulses of each communication are transmitted from various analog signal sources which are individually coupled to the inputs of the respective send gates to the outputs of the respective receive gates corresponding thereto. An individual low-pass filter having its input coupled to the output of each receive gate integrates the amplitude-modulated pulses applied thereto to thereby reproduce at the output of each low-pass filter the analog signal applied to the input of the send gate corresponding thereto.

It will be seen that during each successive time frame, amplitude-modulated pulses originating at each independent analog signal source are sequentially transmitted over the common transmission highway during the successive time slots composing each time frame. Since the common transmission highway unavoidably must have a certain reactance, it has been found that a small residual signal is stored by the common transmission highway at the end of each time slot which is proportional to the amplitude of the amplitude-modulated pulse sample occupying that time slot. These residual signals cause unwanted crosstalk to take place, since successive analog signals transmitted are independent of each other so that there is no relationship between the amplitude of an amplitude-modulated pulse sample transmitted during any one time slot and the amplitude of the amplitude-modulated pulse sample transmitted during the next succeeding time slot. If the time slots are relatively long, only a minor problem is created. However, when the duration of a time slot approaches one microsecond or less, the problem of crosstalk becomes very significant.

One method utilized by the prior art to minimize this unwanted cross-talk is to transmit each amplitude-modulated pulse sample only during a first portion of the time slot it occupies, utilizing the remaining latter portion of each time slot as a guard period. During each guard period, the common transmission highway is clamped to a point of fixed potential, such as ground. This permits substantially all of the residual signal then stored on the common transmission highway to be dissipated during that guard period, so that at the initiation of the next occurring sample any remaining residual signal from the previous sample is of negligible amplitude.

Since even the best of clamp circuits has a certain resistance which limits the discharge time constant of the common transmission highway, the guard period must have at least a certain minimum duration if clamping is to be effective in eliminating unwanted crosstalk. The fact that this is so limits the number of time slots into which a given time frame may be divided, thereby limiting the number of independent communications which may be transmitted over a common transmission highway.

On the other hand, one of the important advantages of a conventional time division multiplex communication system is that a simple and inexpensive low-pass filter may be employed in each receive modem, since the receive gate of each receive modem applies amplitude-modulated sample pulses thereto at a periodic fixed sampling repetition rate equal to the time frame frequency.

In a signal amplitude sequenced time division multiplex communication system, as opposed to a conventional time division multipler communication system, the time of transmission over a common transmission highway of a signal sample during each repetitive time frame is determined by the instantaneous amplitude of the signal being sampled. More particularly, the transmission takes place at that time during each successive time frame when the instantaneous amplitude of an analog signal being sampled is equal to or at least differs by a predetermined amount from the instantaneous amplitude of a periodic signal having a period equal to one time frame, each cycle of which preferably includes a linear ramp signal or at least includes a signal which is a single-valued function with respect to time and which has an amplitude range which is at least as great as the maximum amplitude range of any analog signal.

It will be seen that in a signal amplitude sequenced time division multiplex communication system it is unnecessary to clamp the common transmission highway following each sample transmission, since it is inherently immune to the problem of crosstalk. Therefore, no guard period is required and the number of independent communications which may be transmitted over a common transmission highway is limited solely by the maximum speed of operation of the logic elements employed therein, rather than the minimum duration of a needed guard period following each sample as in conventional time division multiplex communication systems.

Although signal amplitude sequenced time division multiplex communication systems significantly increase the number of communication channels which can be accommodated within a given period time frame, because the normally required guard time following each sampled transmission is eliminated, which is most advantageous, they still have not been utilized to any great extent. The reason for this is that in signal amplitude sequenced time division multiplex communication systems the respective time of occurrences of transmission of successive samples of any individual communication during successive time frames are aperiodic.

Heretofore, each transmitted sample, immediately upon receipt at a receive modem, was applied to the input of the low-pass filter thereof. The application of aperiodically occurring samples to the input of a low-pass filter results in spurious signals, in addition to the reproduced desired analog signal, within the passband of the filter appearing at the output thereof. These spurious signals represent a high level of noise, which in many cases cannot be tolerated. Since the low-pass filter of a conventional time division multiplex system sees a fixed periodic sampling repetition rate, which creates no spurious signals, such systems continue to be used despite the need for eliminating crosstalk and the consequent fewer communication channels which can be accommodated within a given period time frame.

It is therefore an object of the present invention to provide a signal amplitude sequenced time division multiplex communication system wherein the low-pass filter of each receive modem sees a periodic fixed sample repetition rate, rather than an aperiodic variable sample repetition rate.

Briefly, this is accomplished by including at each receive modem two parallel sections interconnecting the common transmission highway with the input of the low-pass filter of that receive modem. Each of the two sections is composed of a sample store, a highway gate effective when enabled for applying samples from the common transmission highway to the store, and a readout gate effective when enabled for applying the stored sample to the input of the low-poss filter. The highway gate of one section and the readout gate of the other section are enabled during each odd time frame, while the highway gate of the other section and the readout gate of the one section are enabled during each even time frame. Therefore, regardless of when a sample is received during any time frame, it is not applied immediately to the input of the low-pass filter, but is applied only at the beginning of the next occurring time frame. Thus, successive samples of each communication will be applied to the input of the low-pass filter associated therewith at a periodic fixed repetition rate which is exactly equal to the time frame frequency.

Figure 1B:
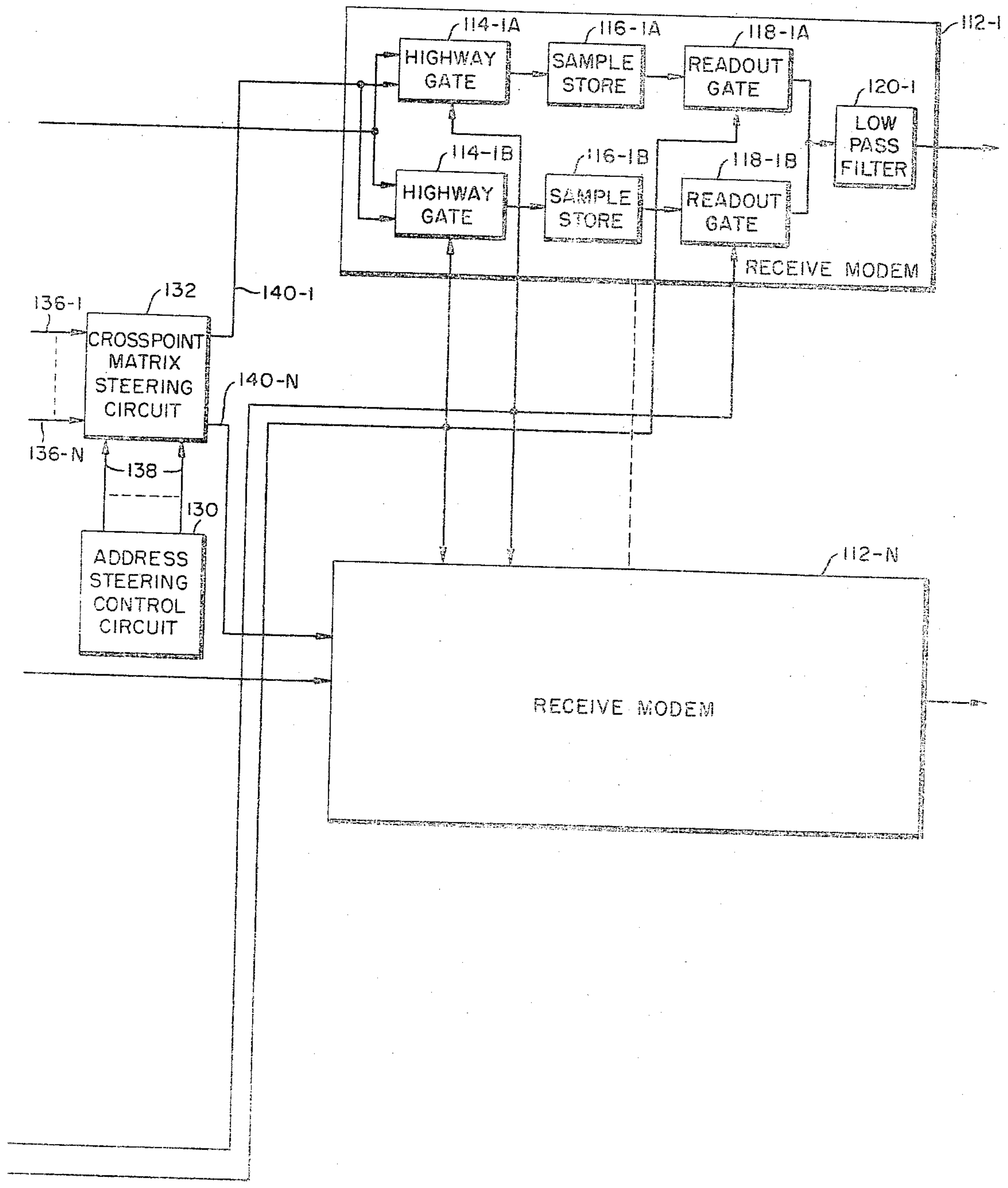
Figure 2:
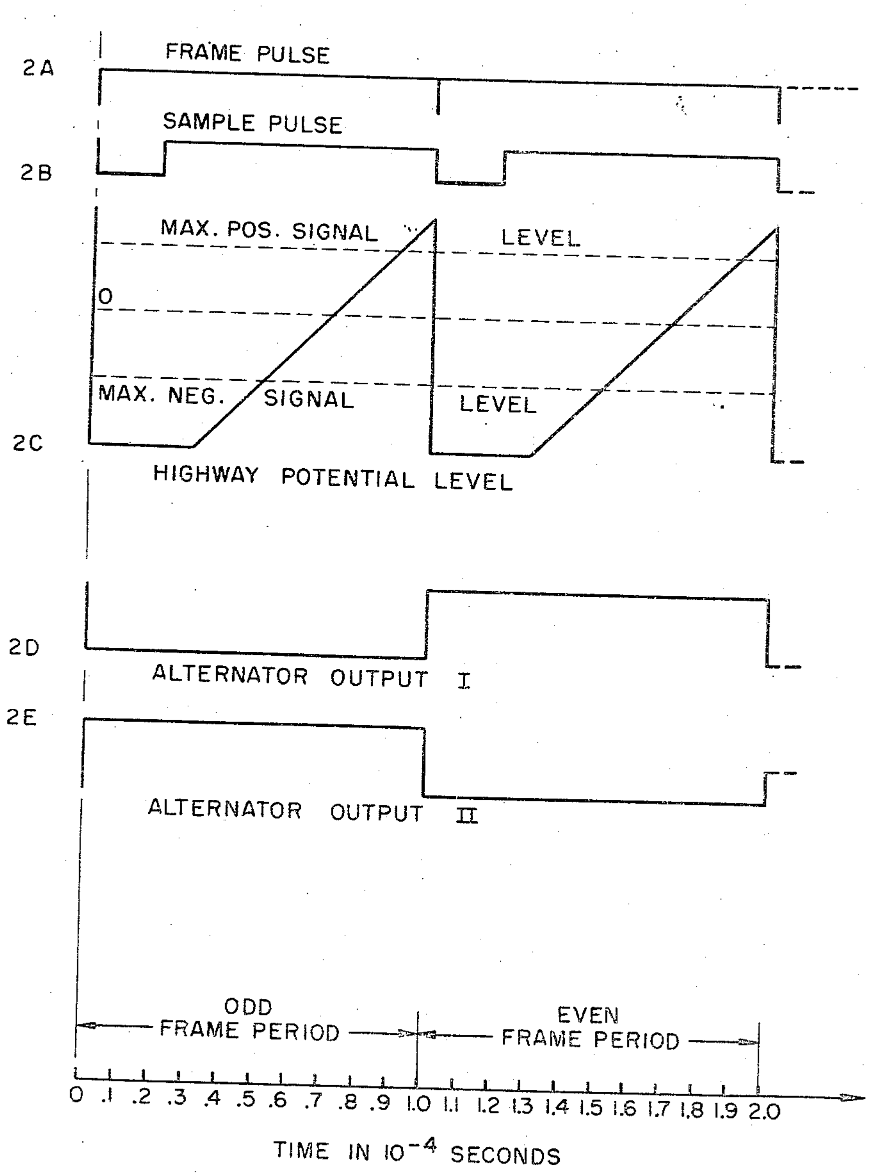

This and other objects, features and advantages of the invention will become more apparent when taken together with the accompanying drawings, in which:

FIGS. 1A and 1B, when combined as shown in FIG. 1C, illustrate a block diagram of the preferred embodiment of the invention; and FIG. 2 provides a timing chart showing the waveform and time of occurrence of various control signals employed in the embodiment shown in FIGS. 1A and 1B.

Referring now to the embodiment illustrated in FIGS. 1A and 1B, there is shown a group of independent signal sources 100–1 . . . 100–N, each of which produces an analog signal, the instantaneous amplitude of which is always between a predetermined maximum negative signal level and a maximum positive signal level.

Individually associated with each of signal sources 100–1 . . . 100–N is a corresponding one of a group of identical send modems 102–1 . . . 102–N. Each send modem includes a sample gate, a sample store, a comparator, and a store clamp, such as the sample gate 104–1, sample store 106–1, comparator 108–1, and store clamp 110–1 of send modem 102–1.

Corresponding with each of send modems 102–1 . . . 102–N is a group of identical receive modems 112–1 . . . 112–N. Each receive modem includes parallel-connected first and second sections each comprising a highway gate, a sample store, and a readout gate, such as first section highway gate 114–1A, sample store 116-1A and readout gate 118–1A, and second section highway gate 114–1B, sample store 116-1B and readout gate 118-1B of receive modem 112–1. Each receive modem further includes a low-pass filter, such as low-pass filter 120–1 of receive modem 112–1, to which the outputs of the readout gates of both the first and second sections of that receive modem are applied. This low-pass filter has a cut-off frequency which is greater than the highest transmitted frequency component of any analog signal and less than the frame frequency.

The embodiment illustrated in FIGS. 1A and 1B further include common equipment comprising frame pulse generator 122, sample pulse generator 124, highway clamp and ramp generator 126, alternator 128, address steering control circuit 130, crosspoint matrix steering circuit 132, and common transmission highway 134.

Frame pulse generator 122 generates sharp frame pulses, shown in graph 2A of FIG. 2, at a predetermined fixed pulse repetition rate, such as 10,000 cycles per second for example, which is greater than twice the highest frequency component of any analog signal to be transmitted.

As shown, the frame pulses from frame pulse generator 122 are applied as an input to sample pulse generator 124. Sample pulse generator 124, which may be a monostable multivibrator which is set in response to each frame pulse and which automatically resets a predetermined time interval thereafter, produces a sample pulse in response to each frame pulse. Each sample pulse, as shown in graph 2B of FIG. 2, may have, for example, a pulse width equal to 0.2 of a frame period.

As shown, frame pulses from frame pulse generator 122 are also applied as an input to highway clamp and ramp generator 126. Highway clamp and ramp generator 126 may include a ramp generator and a monostable multivibrator which is set in response to each frame pulse and which automatically resets a fixed time interval thereafter, which fixed time interval is at least as long as the sample pulse width, but is preferably longer than the sample pulse width. This monostable multivibrator, when in its set condition, is effective in disabling the ramp generator and in applying to the output of highway clamp and ramp generator 126 a fixed predetermined potential clamp level of a given polarity which has an absolute magnitude greater than the maximum signal level of that given polarity of any analog signal. After the monostable multivibrator resets, the ramp generator thereof is enabled to provide a ramp waveform output, which is preferably linear, from highway clamp and ramp generator 126. The ramp waveform output must be of such magnitude that during the remainder of each frame period, the instantaneous potential level of the output of highway clamp and ramp generator 126 changes from the aforesaid clamp potential level to a potential level of a polarity opposite to the aforesaid given polarity which is greater than the maximum signal level of a polarity opposite to the aforesaid given polarity of any analog signal. As shown in graph 2C of FIG. 2, the output of highway clamp and ramp generator 126 may be clamped to a negative potential level which is greater than the maximum negative signal level of any analog signal for a time interval equal to 0.3 of a frame period and then rise linearly during the remainder of the frame period to a positive potential level which is greater than the maximum positive signal level of any analog signal.

As shown, frame pulses from frame pulse generator 122 are also applied as an input to alternator 128 which may be a two-element bistable device, such as a flip-flop, which is switched from a first to a second stable state thereof in response to each odd frame pulse applied thereto and is switched from the second to the first stable state thereof in response to each even frame pulse applied thereto. Two outputs, individually designated I and II, are taken respectively from each of the two elements of the bistable device composing alternator 128. It will be seen that each of alternator 128 outputs I and II will be square waves having a period equal to twice the frame period, but that the square wave of alternator 128 output II will be inverted with respect to alternator 128 output I. Graph 2D of FIG. 2 illustrates alternator 128 output I and graph 2E of FIG. 2 illustrates alternator 128 output II.

The output of each of signal sources 100–1 . . . 100–N is applied as a first input to the sample gate of its corresponding send modem. For instance, in the case of send modem 102–1, the analog signal from signal source 100–1 is applied as a first input to sample gate 104–1 of send modem 102–1.

As shown, each sample pulse emanating from sample pulse generator 124 is applied in common as a second input to all the sample gates of all the send modems. For instance, in the case of send modem 102–1, each sample pulse emanating from sample pulse generator 124 is applied as a second input to sample gate 104–1 of send modem 102–1. Each of the sample gates, such as sample gate 104–1 of send modem 102–1, is normally closed and is opened only during the presence of a sample pulse from sample pulse generator 124. Therefore, all of the independent analog signals from signal source 100–1 . . . 100–N will be simultaneously sampled during the existence of each sample pulse once during each time frame; i.e., in the particular case illustrated in FIG. 2, the analog signal from each of signal sources 100–1 . . . 100–N will be sampled during the first 0.2 of each time frame.

The sample of each send modem is applied as an input to the sample store thereof. For instance, in the case of send modem 102–1, the sample appearing at the output of sample gate 104–1 is applied as an input to sample store 106–1. Each of the sample stores may include an emitter follower feeding a capacitance load, the capacitance load being charged to a potential level proportional to the sample level in response to each sample.

The potential level of the capacitance load of the sample store of each send modem is applied as a first input to the comparator thereof. For instance, in the case of send modem 102–1, the potential level of the capacitance load of sample store 106–1 is applied as a first input to comparator 108–1.

The output of highway clamp and ramp generator 126, which may have the waveform shown in graph 2C of FIG. 2, is applied, as shown, to common transmission highway 134. Therefore, the instantaneous potential level of common transmission highway 134 will follow this waveform. As shown, the potential level appearing on common transmission highway 134 is applied in common as a second input to the comparator of each send modem and as a first input to the store clamp of each send modem. For instance, in the case of send modem 102–1, the potential level appearing on common transmission highway 134 is applied as a second input to comparator 108–1 and as a first input to store clamp 110–1.

Each of the comparators, such as comparator 108–1 of send modem 102–1, compares the sample potential level applied as a first input thereto from the sample store of that send modem with the highway potential level applied thereto as a second input. When the levels become equal, or at least differ from each other by a predetermined amount, the comparator of each send modem, such as comparator 108–1 of send modem 102–1, produces an output pulse therefrom which is applied as a second input to the store clamp of that send modem, such as store clamp 110 of send modem 102–1. Since, as shown in graphs 2B and 2C of FIG. 2, the length of the clamp period of the highway potential level, namely, 0.3 of a time frame period, is longer than the length of the sample pulse period, namely, 0.2 of a time frame period, it is assured that under all signal level conditions the application of a sample to the sample store of a send modem by the sample gate thereof will be completed and the sample gate thereof completely closed prior to the instant at which the comparator thereof produces an output pulse therefrom in response to equality being achieved between the potential levels applied to the first and second inputs thereof.

The store clamp of each send modem, such as store clamp 110–1 of send modem 102–1, consists of a bistable device, such as a flip-flop, which is set in response to the output from the comparator of that send modem, such as comparator 108–1 of send modem 102–1, which is applied as a second input thereto, and which is reset in response to the highway potential level applied as a first input thereto, assuming its clamped potential level at the beginning of the next time frame. The store clamp of each send modem, such as store clamp 110–1 of send modem 102–1, when in its set condition clamps the input of the sample store of each send modem, such as sample store 106–1 of send modem 102–1, to a fixed potential which has a polarity opposite to the given polarity to which the highway potential level is clamped and a level which is higher than the maximum signal of such opposite polarity of the signal level of any analog signal; i.e., in the case where the highway potential level is in accordance with the waveform shown in graph 2C of FIG. 2, the store clamp of each send modem, such as store clamp 110–1 of send modem 102–1, will clamp the input of the sample store thereof, such as sample store 106–1 of send modem 102–1, to a positive potential having a level greater than the maximum positive signal level of any analog signal. Therefore, immediately after the highway potential level reaches the level of the stored sample appearing on the capacitance load of the sample store of any send modem to produce an output pulse from the comparator thereof, the store clamp will charge the capacitance load of that sample store to a fixed potential which is beyond the range of the signal level of any analog signal. This condition will remain until the beginning of the next time frame when the analog signal is again sampled.

Common transmission highway 134 is also connected in common as a first input to the highway gates of both first and second sections of each receive modem, such as highway gates 114–1A and 114–1B of receive modem 112–1. Output I of alternator 128 is applied as a second input to the first section highway gate of each receive modem, such as highway gate 114–1A, and output II of alternator 128 is applied as a first input to the second section highway gate of each receive modem, such as highway gate 114–1B of receive modem 112–1.

The output pulse produced by the comparator of each send modem, such as comparator 108–1 of send modem 102–1, in addition to being applied as an input to the store clamp thereof, such as store clamp 110–1 of send modem 102–1, as previously described, is also applied as an individual input to crosspoint matrix steering circuit 132, over separate input conductors 136–1 . . . 136–N, as shown. Crosspoint matrix steering circuit 132, in accordance with address information supplied thereto over conductors 138 from address steering control circuit 130, interconnects each individual one of input conductors 136–1 . . . 136–N to that seperate predetermined one of output conductors 140–1 . . . 140–N which is selected in accordance with this address information. Each of output conductors 140–1 . . . 140–N is individually coupled as a third input to the highway gates of both sections of that one of receive modems 112–1 . . . 112–N which corresponds thereto. Thus, for instance, output conductor 140–1 is coupled as a third input to both highway gates 114–1A and 114–1B, as shown. Therefore, each one of send modems 102–1 . . . 102–N may be associated with any selected one of receive modems 112–1 . . . 112–N by crosspoint matrix steering circuit 132 in accordance with the address information supplied thereto over conductors 138 by address steering control circuit 130. It will therefore be seen that by means of crosspoint matrix steering circuit 132 an output pulse produced by the comparator of any send modem, such as comparator 108–1 of send modem 102–1, will be forwarded to that receive modem which has been associated therewith in accordance with the aforesaid addre ss information and is there applied as a third input to the highway gates of both sections thereof. In this manner, a communication path may be established between any one of send modems 102–1 . . . 102–N and any one of receive modems 112–1 . . . 112–N.

Each highway gate of each receive modem, such as each of highway gates 114–1A and 114–1B of receive modem 112–1, preferably comprises a bistable device, such as a flip-flop, which is set in response to the leading edge of each cycle of the alternator output applied as a second input to that highway gate and which is reset in response to the comparator pulse output forwarded as a third input to that highway gate, and further comprises means for passing the first inputs applied to that highway gate from the common transmission highway only in response to the bistable device thereof being in its set condition.

It will be seen that the bistable device of the first section highway gate of each receive modem, such as highway gate 114–1A of receive modem 112–1, in response to output I from alternator 128 which is applied as a second input thereto, will be set at the beginning of each odd time frame, while the bistable device of the second section highway gate of each receive modem, such as highway gate 114–1B of receive modem 112–1, in response to ouput II from alternator 128 which is applied as a second input thereto, will be set at the beginning of each even time frame. Thus, at the initiation of each odd time frame, the first section highway gate of each receive modem, such as highway gate 114–1A of receive modem 112–1, is opened and forwards the instantaneous potential level of the waveform on common transmission highway 134, which is applied as a first input thereto, to the input of the first section sample store of each receive modem, such as sample store 116–1A of receive modem 112–1, and at the initiation of each even time frame, the second section highway gate of each receive modem, such as highway gate 114–1B of receive modem 112–1, is opened and forwards the instantaneous potential level of the waveform on common transmission highway 134, which is applied as a second input thereto, to the input of the second section sample store of each receive modem, such as sample store 116–1B of receive modem 112–1.

Each of the sample stores of each of the receive modems, such as sample store 116–1A or sample store 116–1B of receive modem 112–1, consists of a capacitance load which is charged through an emitter follower circuit coupled to the output of the highway gate with which that sample store corresponds. It will be seen that so long as a highway gate is open, the instantaneous potential level to which the capacitance load of the sample store corresponds thereto is charged will follow the instantaneous potential level of the waveform on common transmission highway 134, shown in graph 2C of FIG. 2. However, when an open highway gate of any receive modem is closed in response to the receipt of an output pulse from the comparator of that send modem with which that receive modem is in communication, no further charging of the capacitance load of the sample store can take place. However, the capacitance load of the sample store remains at that particular potential level to which it has been charged at the instant the highway gate corresponding therewith was closed. This particular potential level is equal, or at least proportional, to the potential level of the sample stored in the sample store of the send modem, such as sample store 106–1 of send modem 102–1.

From the foregoing it will be seen that the first section sample store of each receive modem, such as sample store 116–1A, stores the sample which occurs during each odd time frame, while the second section sample store of each receive modem, such as sample store 116–1B, stores the sample which occurs during each even time frame.

Output I of alternator 128, in addition to being applied to the first section highway gate of each receive modem, as described above, is also applied as a control input to the second section readout gate of each receive modem, such as readout gate 118–1B of receive modem 112–1, and output II of alternator 128, in addition to being applied to the second section highway gate of each receive modem, as described above, is also applied as a control input to the first section readout gate of each receive modem, such as readout gate 118–1A of receive modem 112–1. A readout gate of a receive modem is only enabled when the control input applied thereto has a negative polarity. Referring to graphs 2D and 2E of FIG. 2, it will be seen that output I of alternator 128 has a negative polarity only during each entire odd time frame, while output II of alternator 128 has a negative polarity only during each entire even time frame. Therefore, the second section readout gate of each receive modem, such as readout gate 118–1B of receive modem 112–1, which has output I of alternator 128 applied as a control input thereto, will be enabled only during each entire odd time frame, while the first section readout gate of each receive modem, such as readout gate 118–1A of receive modem 112–1, which has output II of alternator 128 applied as a control input thereto, will be enabled only during each entire even time frame.

The readout gate of the first section of each receive modem, such as readout gate 118–1A of receive modem 112–1, couples the output of the first section sample store of each receive modem, such as sample store 116–1A of receive modem 112–1, to the input of the low-pass filter of that receive modem, such as low-pass filter 120–1 of receive modem 112–1, while the readout gate of the second section of each receive modem, such as readout gate 118–1B of receive modem 112–1, couples the output of the second section sample store of each receive modem, such as sample store 116–1B of receive modem 112–1, to the input of the low-pass filter of that receive modem, such as low-pass filter 120–1 of receive modem 112–1. It will be seen that during each odd time frame, when the first section highway gate of each receive modem is open and the second section highway gate of each receive modem is closed, the first section readout gate of each receive modem is closed and the second section readout gate of each receive modem is open; while during each even time frame, when the second section highway gate of each receive modem is open and the first section highway gate of each receive modem is closed, the second section readout gate of each receive modem is closed and the first section readout gate of each receive modem is open. Therefore, when an open highway gate of either section of a receive modem is closed in response to an output pulse forwarded thereto from the comparator of the send modem with which it is in communication, the readout gate of that section of that receive modem will remain closed until the beginning of the next occurring time frame. Therefore, the charge on the capacitance load of that section of that receive modem cannot even begin to discharge until the beginning of the next time frame, when the readout gate of that section of that receive modem is open. However, during the entire next frame period, when the readout gate of that section of that receive modem is open, the stored charge energy on the capacitance load of the sample store of that section of that receive modem discharges into the low-pass filter of that receive modem through the now open readout gate of that section of that receive modem. Thus, during each odd time frame, a sample is applied to the first section of each receive modem while the stored sample applied to the second section of each receive modem during the previous time frame is being readout into the low-pass filter of that receive modem, and during each even time frame a sample is applied to the second section of each receive modem while the stored sample applied to the first section of each receive modem during the previous time frame is being readout into the low-pass filter of that receive modem. The low-pass filter of each receive modem integrates the samples and reproduces the analog signal from that signal source with which that receive modem is in communication. Since successive samples are applied to the input of the low-pass filter of each receive modem at a fixed frequency which is equal to the time frame frequency, no spurious signals are introduced in the output of the low-pass filter.

It will be noted that in the preferred embodiment of the invention, described above, each highway gate is opened at the beginning of a time frame, odd or even as the case may be, and is closed in response to the occurrence of an output pulse forwarded thereto from the comparator of a send modem in communication therewith. Thus each highway gate remains open for a time period which is relatively long compared with the width of the output pulse from the aforesaid comparator. Thus a relatively long time period is provided for charging the capacitance load of a sample store of a receive modem to a potential level proportional to that of a sample. Since the energy stored in a capacitance at any given potential level is proportional to the value of the capacitance, and it is desirable to make the stored energy relatively large, it is desirable that a relatively large capacitance be utilized as the capacitance load of each of the sample stores of the various receive modems. On the other hand, high charging current sources are expensive and therefore undesirable.

The fact that the charging time period of the various sample stores of the receive modems in the preferred embodiment is relatively long makes it possible to utilize therein a capacitance load of relatively high value and yet require a relatively small charging current source for the capacitance load.

If one were content either to utilize a large charging current source or a small capacitance load in each sample store of each modem, more simple and conventional highway gates, which are open only during the short time period when an output pulse from the comparator of a send modem is present, may be substituted for the highway gates utilized in the above described preferred embodiment. However, in this case, the capacitance load of the sample store of a receive modem would have to charge up to the potential level present on the common transmission highway within the short time period of the comparator output pulse.

Although only certain embodiments of the present invention have been described herein, it is not intended that the invention be restricted thereto, but that it be limited by the true spirit and scope of the appended claims.

What is claimed is:

1. In a time division multiplex communication system for transmitting an analog signal from an individual originating point corresponding therewith to a preselected terminating point corresponding thereto, said system comprising a source of analog signal coupled to said originating point, a periodic signal source for producing a periodic signal having a fundamental frequency which is greater than twice as high as the highest frequency component of said analog signal to be transmitted, said periodic signal source including waveform means for producing as an output during each cycle of said periodic signal a predetermined single-valued function with respect to time which has an amplitude range which is at least as great as the maximum amplitude range of said analog signal, first and second receive sample stores, first means coupled to said originating point and said periodic signal source for sampling the instantaneous amplitude of said analog signal once during each cycle of said periodic signal and for transmitting the sample occurring during each odd cycle of said periodic signal to said first receive sample store when a predetermined amplitude difference occurs between the sampled amplitude of said analog signal during that odd cycle and the instantaneous amplitude of said single-valued function and for transmitting the sample occurring during each even cycle of said periodic signal to said second receive sample store when said predetermined amplitude difference exists between the sampled amplitude of said analog signal during that even cycle and the instantaneous amplitude of said single-valued function, a low-pass filter having a cut-off frequency which is greater than said highest frequency component of said analog signal, a first readout gate coupling said first receive sample store to the input of said filter, a second readout gate coupling said second receive sample store to the input of said filter, second means coupling said periodic signal source to said first and second readout gates for opening said first readout gate at the beginning of each even cycle of said periodic signal while maintaining said first readout gate closed for each entire odd cycle of said periodic signal and for opening said second readout gate at the beginning of each odd cycle of said periodic signal while maintaining said second readout gate closed for each entire even cycle of said periodic signal, and coupling means for applying the output of said filter to said preselected terminating point.

2. The system defined in claim 1, wherein said predetermined amplitude difference is zero.

3. The system defined in claim 1, wherein said single-valued function is a linear ramp.

4. The system defined in claim 1, wherein said second means maintains said first readout gate open for each entire even cycle of said periodic signal and maintains said second readout gate open for each entire odd cycle of said periodic signal.

5. The system defined in claim 1, wherein said first means includes a first receive gate coupling said waveform means to said first receive sample store which when open is effective in applying the output of said waveform means to said first receive sample store, a second receive gate coupling said waveform means to said second receive sample store which when open is effective in applying the output of said waveform means to said second receive sample store, third means coupling said periodic signal source to said first and second receive gates for opening said first receive gate only in response to the beginning of each odd cycle of said periodic signal to apply said single-valued function occurring during each odd cycle of said periodic signal to said first receive sample store and for opening said second receive gate only in response to the beginning of each even cycle of said periodic signal to apply said single-valued function occurring during each even cycle of said periodic signal, and fourth means coupled to said first and second receive gates for closing that receive gate which has been opened during each cycle of said periodic signal when said predetermined amplitude difference occurs during that cycle of said periodic signal.

6. The system defined in claim 5, wherein said waveform means produces as an output a clamp level of a given polarity and a given amplitude which is greater than the maximum amplitude of that given polarity of said analog signal for a first minor portion of each cycle of said periodic signal occurring at the beginning thereof, said waveform means producing said single-valued function for the remaining portion of each cycle of said periodic signal, and wherein said fourth means includes a send sample store, a normally closed send sample gate coupling said originating point to said sample store which when open is effective in applying a sample of said analog signal to said sample store, fifth means coupled to said periodic signal source for opening said sample gate for a second minor portion of each cycle of said periodic signal at the beginning thereof, said first minor portion being at least as long as said second minor portion, a comparator responsive to first and second inputs applied thereto for producing an output pulse whenever the respective amplitudes of said first and second inputs thereto are equal to each other, sixth means for applying the stored sample from said send sample stores as said first input to said comparator, seventh means for applying the output of said wavefom means as said second input to said comparator, and eighth means for applying each output pulse from said comparator to said first and second receive gates for closing that receive gate which has been opened during each cycle of said periodic signal, whereby said predetermined amplitude difference is equal to zero.

7. The system defined in claim 6, wherein said fourth means further includes a send sample store clamp coupled between said comparator and said send sample store and having first and second stable conditions for applying a potential having a polarity opposite to said given polarity and a predetermined amplitude level which is greater than the maximum amplitude of a polarity opposite to said given polarity of said analog signal to said send sample store only when in its second stable condition, said send sample store clamp being switched from its first to its second stable condition in response to each output pulse from said comparator, and means for applying the output of said waveform means to said send sample store clamp to effect the switching thereof from its second back to its first stable condition in response to the output of said waveform means assuming its clamping level during each cycle of said periodic signal.

References Cited

UNITED STATES PATENTS 3,158,691 11/1964 Brightman ---------- 179—15

JOHN W. CALDWELL, *Acting Primary Examiner.*

ROBERT L. GRIFFIN, *Examiner.*